May 6, 1952 L. C. DERMOND 2,595,231
ENGINE STARTING AND PROPELLER BLADE PITCH ADJUSTING APPARATUS
Original Filed March 19, 1943 2 SHEETS—SHEET 1
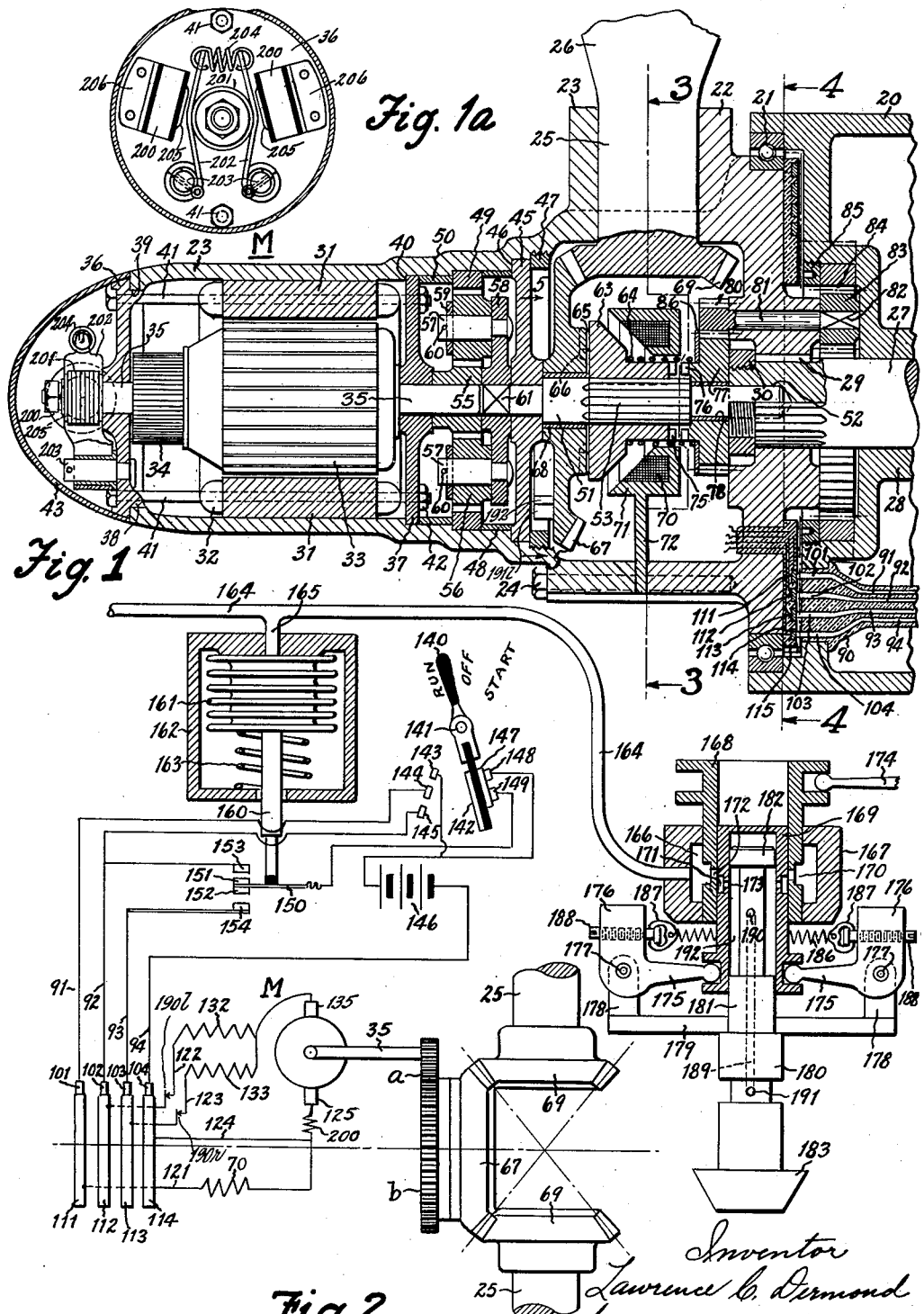

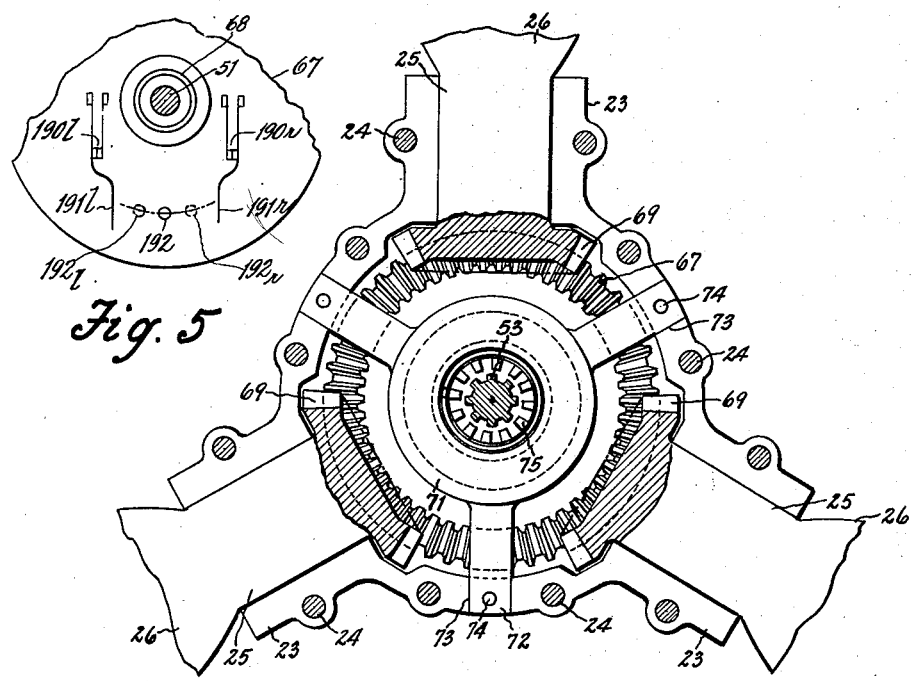
Fig. 5
Fig. 3
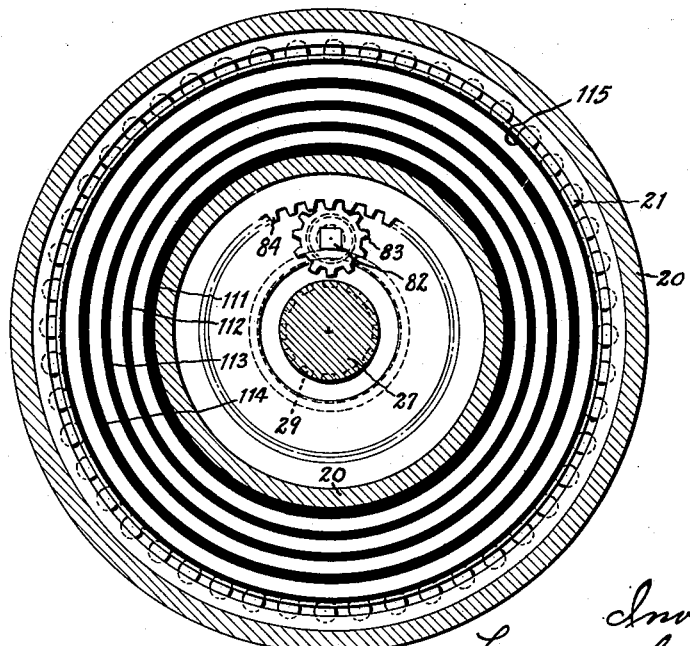
Fig. 4

Patented May 6, 1952

2,595,231

UNITED STATES PATENT OFFICE 2,595,231

ENGINE STARTING AND PROPELLER BLADE PITCH ADJUSTING APPARATUS

Lawrence C. Dermond, Anderson, Ind., assignor to General Motors Corporation, Detroit, Mich., a corporation of Delaware Continuation of application Serial No. 479,762, March 19, 1943. This application March 16, 1944, Serial No. 526,702

8 Claims. (Cl. 170—135.7)

This invention relates to airplanes and it aims to provide mechanisms operated by the same electric motor for starting the engine of the airplane and for adjusting the pitch of its propeller blades.

This application is a continuation of Serial No. 479,762, filed March 19, 1943, now abandoned.

Further objects and advantages of the present invention will be apparent from the following description, reference being had to the accompanying drawings wherein a preferred embodiment of the present invention is clearly shown.

In the drawings:

Fig. 1 is a longitudinal sectional view of an electric motor and mechanisms operated thereby for starting the engine, or changing the propeller blade pitch.

Fig. 1a is a sectional view on line 1a—1a of Fig. 1.

Fig. 2 is a diagram showing the engine cranking or starting circuit and the engine running or propeller pitch adjusting circuit of the electric motor and showing other apparatus for maintaining a selected propeller blade pitch.

Figs. 3 and 4 are sectional views taken respectively on the lines 3—3 and 4—4 of Fig. 1.

Fig. 5 is a fragmentary sectional view taken on line 5—5 of Fig. 1.

Referring to Fig. 1, the frame 20 of the engine supports a ball bearing 21 which supports a housing comprising members 22 and 23 secured by screws 24 shown in Fig. 3 which shows the housing member 23 separated from housing member 22. When fastened together the members 22 and 23 provide bearings for the shanks or roots 25 of propeller blades 26. The engine crank shaft 27 is rotatably supported by a number of bearings provided by the crank case 20, one of these being shown at 28. The shaft 27 drives the housing members 22 and 23 through the splines 29 provided by the shaft 27 and the member 22. Member 22 is retained on shaft 27 by nut 30 engaging the threaded end of shaft 27.

Housing 23 provides the field frame of an electric motor M and supports pole pieces 31 surrounded by field windings 32 and an armature 33 which together with a commutator 34 is mounted on a shaft 35 rotatably supported by plates 36 and 37. Plate 36 has a flange 38 fitting within a bore 39 at the left end of housing 23. Plate 37 fits within a counter-bore in housing 23 providing a shoulder 40. Plates 36 and 37 are secured together by through bolts 41 and cooperating nuts 42. A nose shell 43 is secured to plate 36 in any suitable manner. Commutator brushes not shown are insulatingly supported by the plate 36.

Housing 23 supports a plate 45 received within a counter-bore forming a shoulder 46. Plate 45 is retained by a ring nut 47 and therefore retains a spacer sleeve 48, a ring gear 49 and a spacer sleeve 50. Plate 45 provides a bearing for a shaft 51 supported also by a bearing at 52 provided by crank shaft 27. Shaft 51 has a splined portion 53.

Motor armature shaft 35 drives a sun gear 55 meshing with planet gears 56 rotatably on studs 57 carried by a planet gear spider 58. Gears 56 are retained on the studs 57 by washers 59 and pins 60. Planet gears 56 mesh with ring gear 49. Spider 58 is drivingly connected with shaft 51 through squared portion 61 of shaft 51 which fits in a square hole in the hub of the spider 58.

Shaft 51 is connectible either with engine cranking gears or with propeller blade adjusting gears. For this purpose, the splines 53 of shaft 51 mesh with similar splines provided by a magnetizable armature 63 urged by a spring 64 toward the left so that clutch teeth 65 provided by armature 63 normally mesh with clutch grooves 66 of a bevel gear 67 having a bearing sleeve 68 journalled on shaft 51. Gear 67 meshes with bevel gears 69 respectively connected with propeller blade roots 25.

Armature 63 is moved toward the right against the action of spring 64 by an electromagnet comprising a winding 70 located in a magnetizable core 71 supported by arms 72 extending radially and fitting into grooves 73 provided by housing 23 (Fig. 3) and located by dowel pins 74. When magnet winding 70 is energized, armature 63 moves toward the right to disengage its teeth 65 from grooves 66 of gear 67 and to cause its clutch teeth 75 to engage with clutch teeth 76 provided by a gear 77 having a bearing sleeve 78 journalled on shaft 51. Gear 77 meshes with gear 80 secured to a shaft 81 having a squared portion 82 extending through a square hole in a gear 83 meshing with a ring gear 84 supported by engine crank case 20 and retained by a ring nut 85. Endwise movement of shaft 81 is prevented by the crank case 20 at the right end of the shaft and by a washer 86 abutting the left side of gear 80 and surrounding the hub of gear 77 and retained by the spring 64.

When the shaft 35 of motor M rotates, the shaft 51 is driven at a reduced speed through the planetary gearing including sun gear 55 and planet gears 56 which are caused to roll within the ring gear 49 and thereby to drive the studs 57 and the plate 58. When shaft 51 is connected with gear 67 as shown, rotation of motor shaft 35 in either direction will change the pitch of the propeller blades 26. When it is desired to crank the engine, the magnet coil 70 and the motor M are connected with a current source in order that gear 67 will be disconnected from shaft 51 and that shaft 51 will be connected with gear 77. Gear 77 rotates to cause rotation of gear 80, shaft 81 and gear 83. Rotation of gear 83 causes it to roll within the ring gear 84 and thereby cause orbital motion of the shaft 81 thereby causing rotation of housing 22 and rotation of engine crank shaft 27.

From a control apparatus to be described with reference to Fig. 2, there extend four wires 91, 92, 93 and 94, housed in an insulating cable 90 and terminating in brushes 101, 102, 103, and 104, respectively, engaging, respectively, metal rings 111, 112, 113 and 114 supported by non-conducting annular plate 115 attached to housing member 22. The rings 111 through 114 are connected respectively with wires 121, 122, 123 and 124 as shown best in Fig. 2. Wire 121 leads to magnet coil 70 connected with wire 124. Between wire 124 and motor brush 125 there are connected two parallel-connected magnetic brake release coils 200. Wires 122 and 123 are connected respectively with normally closed limit switches 199-$l$ and 199$r$ connected respectively with field windings 132 and 133 connected with motor brush 135. Fields 132 and 133 are so wound as to produce opposite rotations of the motor armature 33. Hence, only one of the field windings 132, 133 is used at a time, depending upon which direction the motor is required to rotate. The shaft 35 of the motor M is shown in Fig. 2 diagrammatically connected by gears $a$ and $b$ with the bevel gear 67. This is merely a diagrammatic representation of the mechanism shown in detail in Fig. 1. The connections between the motor shaft and the crank shaft for engine starting purposes are not shown in Fig. 2.

When a controller handle 140 pivoted at 141 is moved into the start position, a contact 142 bridges contacts 143, 144 and 145, thereby connecting a current source such as a battery 146 with rings 111 and 112, thereby connecting the source with electromagnet coil 70 and with the motor M, the field winding 132 being operative to cause the motor shaft 35 to rotate in a direction correct for engine cranking purposes.

Since the normal position of the parts is that shown in Fig. 1, the magnet 70 has to be energized to enable the starting motor to crank the engine. The energization of magnet coil 70, according to the circuit shown in Fig. 2, causes the attraction of armature 63, shown in Fig. 1, so as to disconnect gear 67 from the motor M and connect the motor with the gear 77 and other gears of the train of engine cranking gears. When the engine has been started, the handle 140 is moved into the run position, as shown, thereby causing a contact 147 to bridge contacts 148 and 149, thereby connecting the battery 146 with a plate 150 carrying contacts 151 and 152 adapted to engage contacts 153 and 154 respectively, which are connected with wires 92 and 93, respectively. The engagement of these contacts is controlled by speed responsive means which causes the motor M to adjust the propeller blade pitch so that a certain selected engine speed will be maintained.

The pitch control apparatus comprises a rod 160 attached to plate 150 and insulated therefrom. Rod 160 is attached to a metal bellows 161 housed within a box 162 to which the upper end of the bellows 161 is attached. Between the lower end of the bellows and the bottom wall of the housing is located a spring 163 which is opposed by fluid pressure within the bellows 161. The source of fluid pressure may be the engine oil system with which the control apparatus is connected by a pipe 164 having a branch 165 communicating with the interior of bellows 161. Pipe 164 leads to a chamber 166 provided by a stationary box 167, supporting slide valves 168 and 169 having grooves 170 and 171, respectively, and communicating ports 172 and 173 respectively. Slide valve 168 is manually adjusted by an arm 174 for the purpose of selecting various engine speeds to be maintained. Slide valve 169 is adjusted by arms 175 integral with governor weights 176 pivoted at 177 upon brackets 178 provided by a weight base plate 179 driven by a shaft 180 having pilot surfaces 181 and 182 for guiding the slide valve 169. Shaft 180 carries a bevel gear 183 meshing with an engine driven bevel gear, not shown. As speed increases, the weights 176 tend to separate and this action is opposed by a spring 186 connected at its ends with stirrups 187 connected with the weights by adjustable screws 188. Shaft 180 is provided with a longitudinal passage 189 communicating with side passages 190 and 191, thereby placing the space 192 in the slide valve 169 in communication with the low pressure oil return pipe of the engine oil system. Pipe 164 is connected with the high pressure oil supply. When pipe 164 is bled to a predetermined extent as determined by the overlapping of port 172 of valve 168 with the groove 171 of valve 169, the pressure then existing in the bellows 171 will oppose the spring 163 to such extent that the two forces will be in equilibrium, the contacts 151 and 152 being separated from the contacts 153 and 154. In this status of the apparatus, the propeller pitch is being maintained at the desired angle for allowing the engine to maintain a certain speed. As the speed of the engine varies, the weights 176 will be brought together by the spring 186, thereby causing the slide valve 169 to move downwardly to stop the bleeding of pipe 164, whereupon pressure in the bellows 161 increases and contacts 152 and 154 are engaged, thereby causing the motor M to operate with the field winding 133 energized. This causes such rotation of the propeller blade roots 25 as to cause the pitch to decrease so that the engine speed will increase. On the other hand, if engine speed increases above the set speed, then the weights 176 will move apart and the valve 169 will move upwardly to increase the bleeding, thereby decreasing the pressure in bellows 161 and thereby allowing the spring 163 to elevate the contact 151 into engagement with contact 153. Then the motor operates with its field 152 energized and causes the propeller blade roots to be rotated so that the pitch will increase, thereby causing the engine speed to decrease. In this way engine speed is maintained within required limits of certain selected speed. The selected speed is varied by moving the slide valve 168. If valve 168 is moved down, the governed speed of the engine will be decreased; and, if valve 168 is moved up, the governed speed of the engine will be increased. When the engine is not running or is not to be started, the controller handle 140 is moved to the "off" position, thereby disconnecting the battery 146 from the motor M and the magnet coil 70.

When the circuit between motor M and battery 146 is interrupted, its shaft 35 is held stationary by a brake comprising a drum 201 fixed to shaft 35 and engaged by shoes 202 pivoted upon studs 203 fixed to plate 36. Spring 204 urges the shoes 202 against the drum 201. When the motor circuit is closed, coils 200 are energized and cause attraction of the shoes 202 toward the pole faces of magnetizable cores 205 which are surrounded by the coils 200 and which are carried by brackets 206 fixed to plate 36. Therefore, the required propeller pitch is maintained while the motor is not operating to change the pitch.

The extents to which the propeller pitch is changed in either direction to effect increase or decrease in speed are limited by the opening of the limit switches 190–l or 190r. These switches are opened when their spring blades 191–l or 191r are contacted and moved by a pin 192 carried by the gear 67 as shown in Fig. 5. The limit switches 190–l and 190r are insulatingly supported by plate 45 (Fig. 1) in any suitable manner.

During cranking, the blades 26 are free to turn to the angle offering least resistance to the rotation of the engine.

While the embodiment of the present invention as herein disclosed, constitutes a preferred form, it is to be understood that other forms might be adopted, all coming within the scope of the claims which follow.

What is claimed is as follows:

1. Engine starting and propeller pitch changing apparatus comprising, an internal combustion engine, a propeller operated thereby and having blades supported for rotation about the axes of their roots, an electric motor, a current source, two circuits respectively for causing the motor to be connected with the source for operation of the motor in opposite directions, a third circuit for causing the motor to be connected with the source for operation of the motor in a direction to crank the engine, means responsive to engine speed for controlling the first two circuits in order that the motor will rotate the blades to a pitch setting required to maintain a selected engine speed, means for modifying the operation of said control means in order to vary the governed speed of the engine, gearing for connecting the motor with the blades for pitch adjustment thereof, gearing for connecting the motor with the engine for cranking purposes, and means for selectively rendering operative the control of the motor through the first two circuits or for causing the motor to operate as a starting motor and concurrently therewith for disconnecting the first mentioned gearing and connecting the second mentioned gearing.

2. In a power plant for aircraft the combination of an internal combustion engine, a variable pitch propeller, a current source, an electric motor operable by said current source, operating mechanism normally connecting the motor in driving relation with the propeller blades and effective to rotate such blades about their axes in order to change the pitch of the propeller upon operation of said motor, means for disabling said operating mechanism and for establishing a driving connection between said motor and the engine so that the same motor may be rendered operative to rotate the engine for starting purposes, an electromagnet for operating said last named means, a series of circuits for connecting the electromagnet and the motor with the current source, a manually operable controller for controlling the completion of said circuits in order to control the effectiveness of the electromagnet and motor, said controller having two operative positions, in both of which the motor circuit is closed, but in one of which the magnet is energized whereby in one position of the controller the motor is caused to operate the engine and in the other the motor is connected with the propeller blades, and an automatic circuit controlling means operable by fluid pressure also effective to control the action of the motor when the manual controller is in such position as to bring about the connection of the motor with the propeller blades.

3. In a power plant for aircraft the combination of an internal combustion engine, a variable pitch propeller, a current source, an electric motor operable by said current source, operating mechanism normally connecting the motor in driving relation with the propeller blades and effective to rotate such blades about their axes in order to change the pitch of the propeller upon operation of said motor, means for disabling said operating mechanism and for establishing a driving connection between said motor and the engine so that the same motor may be rendered operative to rotate the engine for starting purposes, an electromagnet for operating said last named means, a series of circuits for connecting the electromagnet and the motor with the current source, a manually operable controller for controlling the completion of said circuits in order to control the effectiveness of the electromagnet and motor, said controller having two operative positions, in both of which the motor circuit is closed, but in one of which the magnet is energized whereby in one position of the controller the motor is caused to operate the engine and in the other the motor is connected with the propeller blades, and an automatic circuit controlling means operable in response to engine speed also effective to control the action of the motor when the manual controller is in such position as to bring about the connection of the motor with the propeller blades.

4. In a power plant for aircraft the combination of an internal combustion engine, a variable pitch propeller, a current source, an electric motor operable by said current source, operating mechanism normally connecting the motor in driving relation with the propeller blades and effective to rotate such blades about their axes in order to change the pitch of the propeller upon operation of said motor, means for disabling said operating mechanism and for establishing a driving connection between said motor and the engine so that the same motor may be rendered operative to rotate the engine for starting purposes, an electromagnet for operating said last named means, a series of circuits for connecting the electromagnet and the motor with the current source, a manually operable controller for controlling the completion of said circuits in order to control the effectiveness of the electromagnet and motor, said controller having two operative positions, in both of which the motor circuit is closed, but in one of which the magnet is energized whereby in one position of the controller the motor is caused to operate the engine and in the other the motor is connected with the propeller blades, and an automatic circuit controlling means operable in response to engine speed also effective to control the action of the motor and its direction of rotation when the manual controller is in such position as to bring about the connection of the motor with the propeller blades.

5. In a power plant for aircraft, the combination of an internal combustion engine, a variable pitch propeller operated thereby, means for variably moving the blades thereof to change the pitch of said blades during the operation of said propeller by the engine to thereby control the governed speed of said engine, means for automatically and variably controlling the pitch changing movement of said blades as desired to maintain operation of the engine at any selected speed, a current source, an electric motor operable by current from said source, operating connections between the motor and the engine and between the motor and said blade moving means whereby the motor may be operatively connected with the engine when the latter is inoperative in order to start it, or may be connected with the blade moving means during engine operation to effect pitch changing movements of the blades in order to control engine speed, control mechanism movable to different positions to determine whether the motor is operatively connected to the motor or to the blade moving means, and automatic fluid pressure means operable to determine the direction of rotation of the motor when said motor is connected to the blade moving means.

6. In a power plant for aircraft, the combination of an internal combustion engine, a variable pitch propeller operated thereby, means for variably moving the blades thereof to change the pitch of said blades during the operation of said propeller by the engine to thereby control the governed speed of said engine, means for automatically and variably controlling the pitch changing movement of said blades as desired to maintain operation of the engine at any selected speed, a current source, an electric motor operable by current from said source, operating connections between the motor and the engine and between the motor and said blade moving means whereby the motor may be operatively connected with the engine when the latter is inoperative in order to start it, or may be connected with the blade moving means during engine operation to effect pitch changing movements of the blades in order to control engine speed, control mechanism movable to different positions to determine whether the motor is operatively connected to the engine or to the blade moving means and automatic means responsive to engine speed for determining the direction of rotation of the motor when said motor is operatively connected to the blade moving mechanism.

7. In a power plant for aircraft, the combination of an internal combustion engine, a variable pitch propeller operated thereby, means for variably moving the blades thereof to change the pitch of said blades during the operation of said propeller by the engine to thereby control the governed speed of said engine, means for automatically and variably controlling the pitch changing movement of said blades as desired to maintain operation of the engine at any selected speed, a current source, an electric motor operable by current from said source, operating connections between the motor and the engine and between the motor and said blade moving means whereby the motor may be operatively connected with the engine when the latter is inoperative in order to start it, or may be connected with the blade moving means during engine operation to effect pitch changing movements of the blades in order to control engine speed and means responsive to engine speed for controlling the operation of said motor to effect pitch changing movement of the blades.

8. In a plant for aircraft, the combination of an internal combustion engine, a variable pitch propeller operated thereby, means for variably moving the blades thereof to change the pitch of said blades during the operation of said propeller by the engine to thereby control the governed speed of said engine, means for automatically and variably controlling the pitch changing movement of said blades as desired to maintain operation of the engine at any selected speed, a current source, an electric motor operable by current from said source, operating connections between the motor and the engine and between the motor and said blade moving means whereby the motor may be operatively connected with the engine when the latter is inoperative in order to start it, or may be connected with the blade moving means during engine operation to effect pitch changing movements of the blades in order to control engine speed, control mechanism movable to different positions to determine whether the motor is operatively connected to the engine or to the blade moving means and means responsive to engine speed for controlling the operation of said motor to effect pitch changing movement of the blades.

LAWRENCE C. DERMOND.

REFERENCES CITED

The following references are of record in the file of this patent:

UNITED STATES PATENTS

| Number | Name | Date |
|---|---|---|
| 1,758,118 | Lansing | May 13, 1930 |
| 1,785,319 | Lansing | Dec. 16, 1930 |
| 2,124,078 | Palmer et al. | July 19, 1938 |
| 2,127,687 | Heath | Aug. 23, 1938 |
| 2,181,985 | Waseige | Dec. 5, 1939 |
| 2,228,776 | Mullen | Jan. 14, 1941 |
| 2,229,058 | Dicks | Jan. 21, 1941 |
| 2,291,953 | Dicks | Aug. 4, 1942 |
| 2,344,083 | Freitag et al. | Mar. 14, 1944 |
| 2,375,028 | Nardone | May 1, 1945 |
| 2,378,938 | McCoy | June 26, 1945 |

FOREIGN PATENTS

| Number | Country | Date |
|---|---|---|
| 853,372 | France | Dec. 7, 1939 |
| 526,028 | Great Britain | Sept. 10, 1940 |
| 538,386 | Great Britain | July 31, 1941 |